United States Patent [19]

Sugita et al.

[11] Patent Number: 5,534,324
[45] Date of Patent: Jul. 9, 1996

[54] MAGNETIC RECORDING MEDIUM AND METHOD FOR PRODUCING THE SAME

[75] Inventors: Ryuji Sugita; Kiyokazu Tohma, both of Hirakata; Tatsuaki Ishida, Sakai; Yasuaki Ban, Neyagawa, all of Japan

[73] Assignee: Matsushita Electric Industrial Co., Ltd., Osaka-Fu, Japan

[21] Appl. No.: 151,704

[22] Filed: Nov. 10, 1993

[30] Foreign Application Priority Data

Nov. 12, 1992 [JP] Japan ................................ 4-302026

[51] Int. Cl.$^6$ .............................. H01F 1/00; G11B 5/66; G11B 5/70
[52] U.S. Cl. ...................... 428/694 T; 428/611; 428/678; 428/694 TS; 428/694 TM; 428/694 TP; 428/694 TC; 428/900
[58] Field of Search .......................... 428/694 TS, 694 T, 428/694 TM, 694 SL, 212, 678, 611, 408, 212, 900, 928, 457, 694 TP, 694 TC; 427/131, 132, 250; 204/192.2

[56] References Cited

U.S. PATENT DOCUMENTS 4,385,098  5/1983  Sugita et al. ............................ 428/629
4,540,600  9/1985  Robayashi et al. ..................... 427/130
4,770,924  9/1988  Takai et al. ............................. 428/212

FOREIGN PATENT DOCUMENTS 0053811   6/1982   European Pat. Off. .
0488377   6/1992   European Pat. Off. .
59-058804 4/1984   Japan .
59-185024 10/1984  Japan .
62-285220 12/1987  Japan .
62-289911 12/1987  Japan .
63-10315  1/1988   Japan .
64-53332  3/1989   Japan .

Primary Examiner—Paul J. Thibodeau
Assistant Examiner—Stephen Sand
Attorney, Agent, or Firm—Panitch Schwarze Jacobs & Nadel

[57] ABSTRACT

A magnetic recording medium has a cobalt-based first magnetic layer and a cobalt-based second magnetic layer which are formed on a substrate of high polymer by vacuum evaporation. In order to have a high reproducing output and a high S/N ratio, the first magnetic layer has high oxygen density area which is arranged at a vicinity of the second magnetic layer, and the second magnetic layer has high oxygen density area which is arranged at a vicinity of the first magnetic layer.

8 Claims, 4 Drawing Sheets

Depth of Magnetic recording medium [ Å ]

MAGNETIC RECORDING MEDIUM AND METHOD FOR PRODUCING THE SAME

FIELD OF THE INVENTION

1. Field of the Invention

The present invention relates to a magnetic recording medium and a method for producing the same. More particularly, the present invention relates to a thin film magnetic recording medium which has a high S/N ratio and a high reproducing output, and a method for producing such thin film magnetic recording medium.

2. Description of the Related Art

In recent years, a small sized magnetic recording and reproducing apparatus having high density has been developed, and a magnetic recording medium having excellent recording and reproducing characteristics in a short-wavelength range has been required for the small sized magnetic recording and reproducing apparatus. At present, most magnetic recording and reproducing apparatus have used a coated type magnetic recording medium, which is formed by coating magnetic particles on a substrate. There have been a number of improvements in the coated type magnetic recording medium, in order to meet the requirement for the small-sized magnetic recording and reproducing apparatus. But, there is little room for improvement of the coated type magnetic recording medium.

A magnetic recording medium of thin film type has been developed as one of most favorable magnetic recording medium which exceeds the limit of recording density performance in the conventional magnetic recording medium. The thin film type magnetic recording medium can be produced by a vacuum evaporation method, a sputtering method, a plating method or the like. The thin film type magnetic recording medium produced by such methods have excellent recording and reproducing characteristics in a short-wavelength range. A magnetic layer in the thin film type magnetic recording medium is formed by cobalt-based magnetic materials, for example, Co, Co—Ni, Co—Ni—P, Co—O, Co—Ni—O, Co—Cr, Co—Ni—Cr, etc. The vacuum evaporation method is the most preferable for practical forming of the magnetic layer. An evaporated magnetic recording tape having the magnetic layer made of Co—Ni—O is on the market as the tape for "Hi 8" (high band 8 mm) video cassette recorder (VCR).

It is likely that in the future, the magnetic recording and reproducing apparatus will be smaller and have even higher recording capacity. In order to achieve such objects, a linear recording density and track recording density on the magnetic recording medium must be improved to be used by such magnetic recording and reproducing apparatus. Accordingly, it is necessary to provide a magnetic recording medium having improved S/N ratio, particularly S/N ratio in a short-wavelength range.

OBJECT AND SUMMARY OF THE INVENTION

An object of the present invention is to provide a magnetic recording medium having improved S/N ratio and high reproducing output.

In order to achieve the above-mentioned object, the magnetic recording medium of the present invention comprises:

a substrate, a cobalt-based first magnetic layer, of which an axis of easy magnetization slants at an angle to a normal of a plane of said magnetic recording medium, and in which high oxygen density area is arranged at a vicinity of the opposite face to the substrate, and a cobalt-based second magnetic layer of which an axis of easy magnetization slants at an angle to a normal of a plane of the magnetic recording medium, and in which high oxygen density area is arranged at a vicinity of the cobalt-based first magnetic layer.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

In the following paragraph, a magnetic recording medium of the present invention will be explained in detail by making reference to the accompanying drawings.

Figure 1:
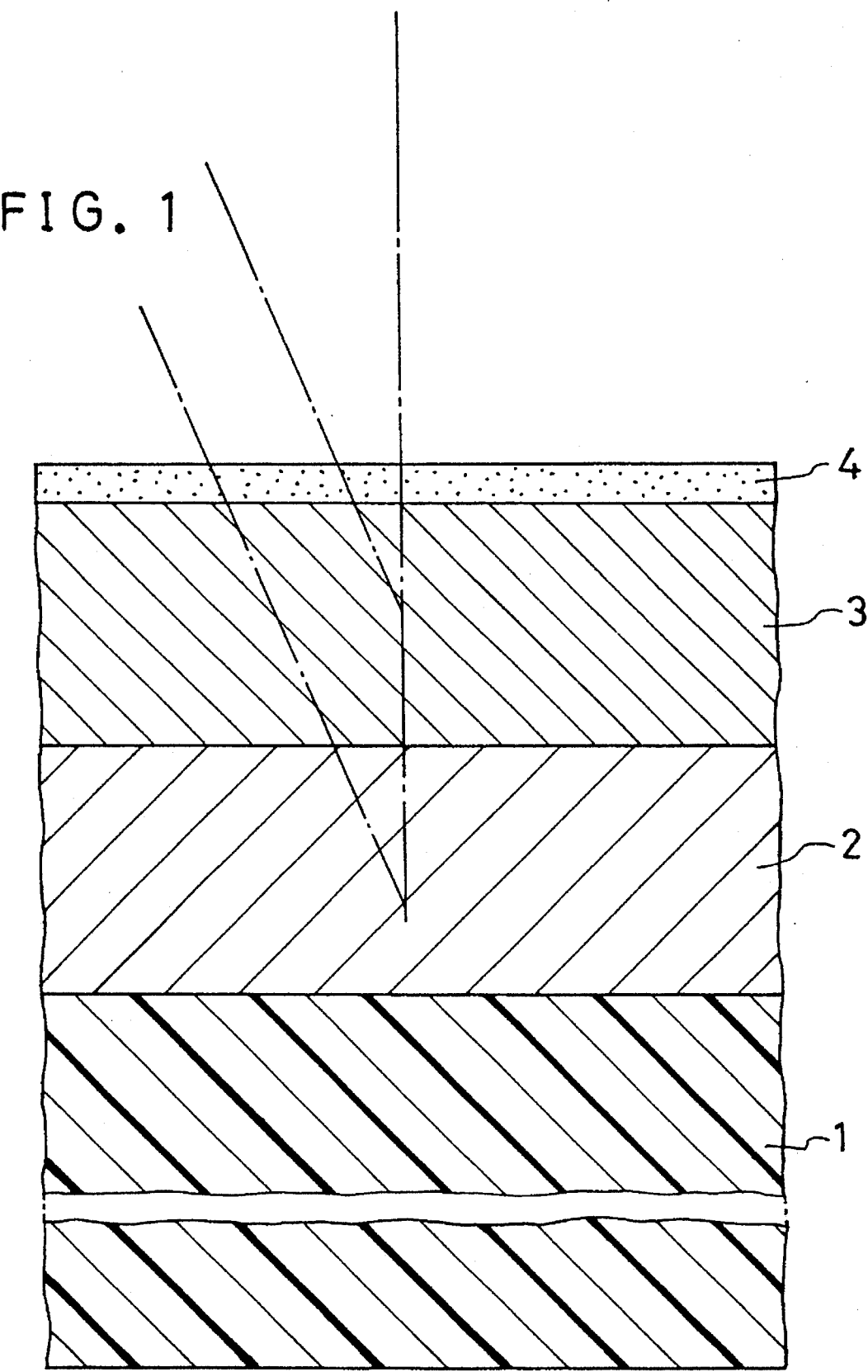
FIG. 1 is a cross sectional view of a magnetic recording medium in accordance with the present invention.

FIG. 1 is a cross-sectional view of a magnetic recording medium which is made by the method of the present invention.

As shown in FIG. 1, the magnetic recording medium comprises a substrate 1 of high polymer, a first magnetic layer 2, a second magnetic layer 8 and a protective layer 4. The first magnetic layer 2 is formed on the substrate 1, and the second magnetic layer 3 is subsequently formed on the first magnetic layer 2.

Figure 2:
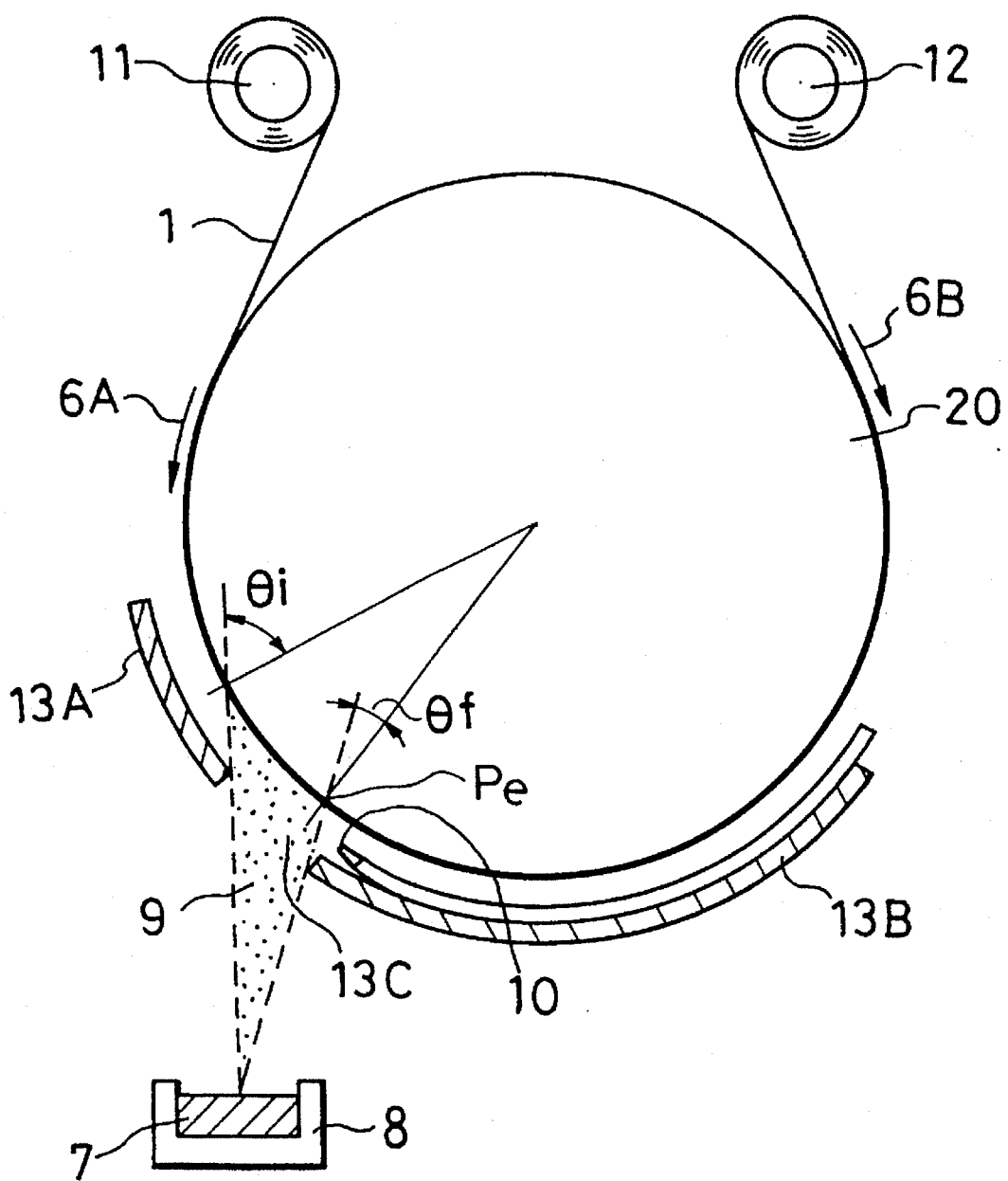
FIG. 2 schematically illustrates one embodiment of a vacuum evaporation apparatus for producing the magnetic recording medium in accordance with the present invention.

Next, a method for producing the magnetic recording medium will be explained by making reference to FIG. 2. FIG. 2 schematically illustrates a vacuum evaporation apparatus for producing the magnetic recording medium.

The first magnetic layer 2 of the magnetic recording medium is deposited on the substrate 1 by a vacuum evaporation apparatus. In the deposition of the first magnetic layer 2, the substrate 1 travels around a peripheral surface of a cylindrical can 20 in a direction indicated by an arrow 6A. The substrate 1 is unwound from a supply roll 11, and wound on a take-up roll 12. Between an evaporation source 8 having a magnetic material 7 and the cylindrical can 20 there is provided shielding plates 13A, 13B for preventing deposition of undesirable evaporated magnetic metal on the substrate 1. The evaporated magnetic metal 9 from the evaporation source 8 is deposited on the substrate 1 through a window 13C between the shielding plates 18A, 18B. The magnetic material 7 of the evaporation source 8 is selected from cobalt-based alloy magnetic materials, for example Co, Co—Ni etc. In the vacuum evaporation apparatus, an electron beam evaporation source is utilized for evaporating the magnetic metals, such as cobalt-based alloy having high melting point, at a very high evaporated speed. The evaporated magnetic metal 9 is deposited on the substrate 1 through the window 13C, which sets the range of incident angle from an initial incident angle $\theta i$ to a final incident angle $\theta f$ against the normal to the plane of the substrate 1. In other words, the angles $\theta i$ and $\theta f$ are incident angles at which the evaporated magnetic metal 9 is impinged at a deposition starting point and a deposition ending point on the cylindrical can 20 in order to form a first magnetic layer 2 on the substrate 1. In order to have a high reproducing output, the incident angle for the first magnetic layer 2 is preferably to be set at conditions such that the final incident angle $\theta f$ is smaller than the initial incident angle $\theta i$, and the final incident angle $\theta f$ is set above 40°. A nozzle 10 for introducing oxygen is disposed in a vicinity of a deposition ending point of the cylindrical can 20 as shown in FIG. 2. The nozzle 10 having a slit-shaped hole or plural holes disposed in a line issues a stream of the oxygen along the surface of the deposited magnetic metal in the deposition process of the first magnetic layer 2.

Next, the method for forming the second magnetic layer 3 of the magnetic recording medium will be explained.

After forming the first magnetic layer 2 by the vacuum evaporation method, the substrate 1 having the first magnetic layer 2 has been wound up by the take-up roll 12. The substrate 1 wound on the take-up roll 12 is transferred on to the circumference of the cylindrical can 20 which rotates in a direction shown by an arrow 6B. Then the substrate 1 is wound up by and on the supply roll 11. In this rewinding operation, electric power for the evaporation source 8 may be turned off so that the magnetic material 7 does not evaporate. Alternatively the window 13C between the shielding plates 13A, 13B may be closed by a shutter (not shown) in order to prevent the substrate 1 from forming of the evaporated magnetic metal 9.

Next, the second magnetic layer 3 is deposited on the first magnetic layer 2 by a step similar to the deposition of the first magnetic layer 2. In this deposition step, the substrate 1 travels in a direction indicated by an arrow 6A in FIG. 2. In this step, the incident angle for the second magnetic layer 3 is preferably set at the same condition as the incident angle for producing the first magnetic layer 2. That is the final incident angle $\theta f$ is smaller than the initial incident angle $\theta i$, and the final incident angle $\theta f$ is set above 40°.

In the producing process of the first and second magnetic layers 2 and 3, cobalt alloy used as the magnetic material 7 is melted in the evaporation pot and serves as an evaporation source. The nozzle 10, which is disposed adjacent to the deposition ending point of the cylindrical can 20, blows oxygen into the evaporated magnetic metal 9.

After forming the first and second magnetic layers 2 and 3 on the substrate 1, the magnetic recording medium is taken out from the vacuum deposition apparatus, and is disposed in a vacuum chamber for plasma treatment. In the vacuum chamber for plasma treatment, the magnetic recording medium, which is running, is exposed by plasma of a mixed gas Ar and $CH_4$. As a result, the oxygen density proximate the second magnetic layer 3 is decreased, and a protective layer 4 of carbon is formed on the second magnetic layer 3.

Figure 3:
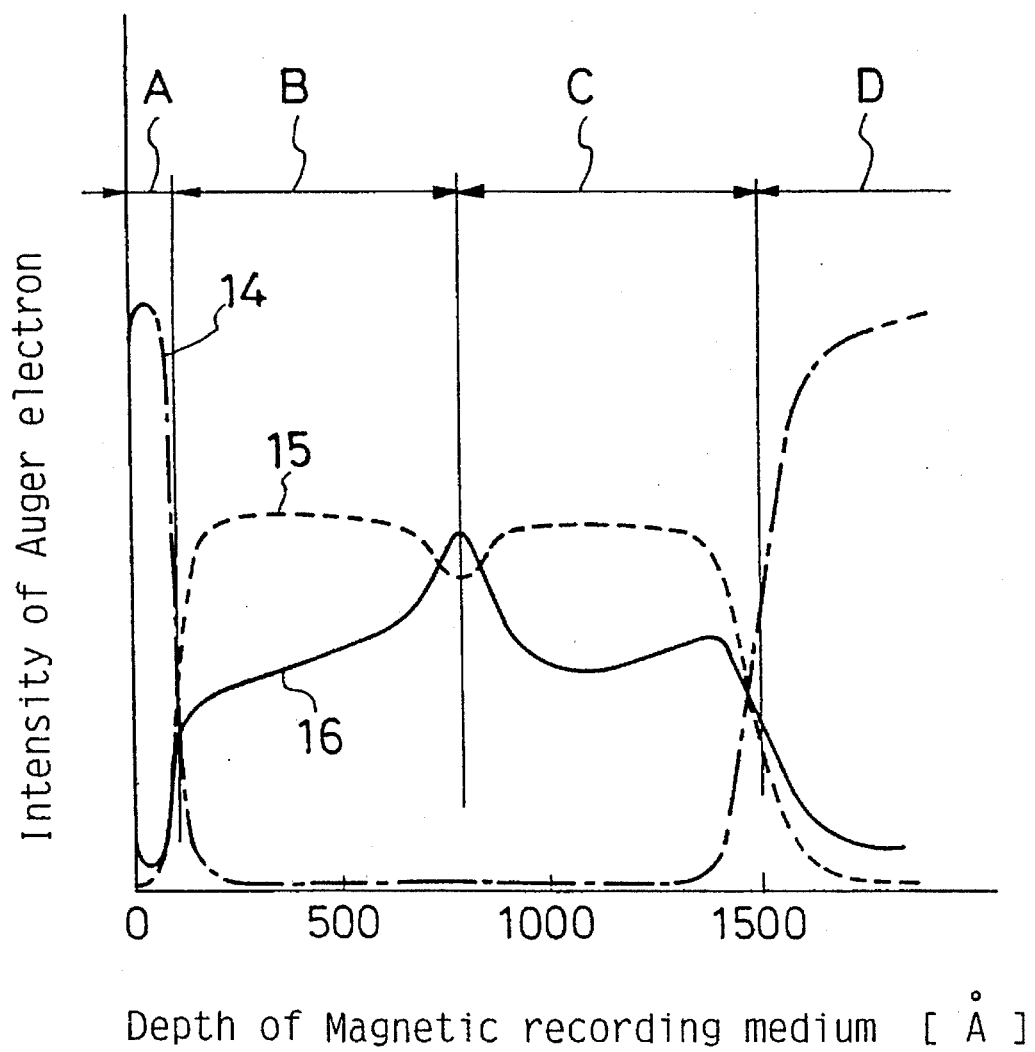
FIG. 3 is an Auger depth profile which shows results of analysis of the magnetic recording medium by using a method of Auger electron spectroscopy.

FIG. 3 shows results of Auger electron spectroscopy analysis for one example of the magnetic recording medium which is produced by utilizing the above-mentioned vacuum evaporation method in accordance with the present invention. FIG. 3 shows the relationship between a depth of the thickness from the surface of the magnetic recording medium (abscissa) and intensity of the Auger electron (ordinate) in the magnetic recording medium. In FIG. 3, 0 Å [Angstrom] indicates a position of the surface of the magnetic recording medium, an alternate long and short dash line 14 shows carbon, a curved broken line 15 shows cobalt, and a curved line 16 shows oxygen. A range A is an area of the carbon protective layer 4, a range B is an area of the second magnetic layer 3, a range C is an area of the first magnetic layer 2, and a range D is an area of the substrate 1 of high polymer.

One of the characteristics of the present invention is a curved distribution of the oxygen density in the first and second magnetic layers 2 and 3. That is, the high oxygen density area in the first magnetic layer 2 is arranged proximate the second magnetic layer 3, and the high oxygen density area in the second magnetic layer 3 is arranged proximate the first magnetic layer 2. The above-mentioned deposition condition is possible by means of the following adjustments: arrangement of the nozzle 10 for introducing oxygen, introducing amount of oxygen, arrangement (distance and angle etc.) of the evaporation source 8, arrangements of the window 13C between the shielding plates 13A, 13B, conditions (exposing time interval and substrate temperature etc.) of the plasma treatment and so on.

In the producing process of the first and second magnetic layer 2 and 3, it is important that the nozzle 10 is disposed proximate the deposition ending point Pe (corresponding to the final incident angle $\theta f$) of the cylindrical can 20 in order to effectively blow oxygen into the evaporated atoms of the magnetic metal. Especially, in the producing process for the second magnetic layer 3, it is important that the deposition step and the plasma treatment step are carried out at suitable conditions in order to have the high oxygen density area at a vicinity of the first magnetic layer 2. If the nozzle 10 would be disposed proximate the deposition starting point of the cylindrical can 20, and blown into the evaporated atoms in the producing process for the second magnetic layer 3, such magnetic recording medium would not have a characteristic high reproducing output.

In the producing processes for the first magnetic layer 2 and the second magnetic layer 3, the incident angle is preferably set at the aforementioned conditions such that the initial incident angle $\theta i$ is higher than the final incident angle $\theta f$ ($\theta i > \theta f$). If a magnetic recording film were formed in an opposite condition that the incident angle was set at $\theta i < \theta f$, a high reproducing output could not be obtained, and durability would be remarkably deteriorated.

As mentioned above, the magnetic recording medium in accordance with the present invention has the first magnetic layer 2 and the second magnetic layer 3, of which the axis of easy magnetization slant from the normal of the plane of the magnetic recording medium. The first magnetic layer 2 is formed by cobalt-based material having the high oxygen density area proximate the second magnetic layer 3. The second magnetic layer 3 is formed by cobalt-based material having the high oxygen density area proximate the first magnetic layer 2.

Next, concerning the first magnetic layer 2 and the second magnetic layer 3, the relation between the recording and reproducing characteristics and the distribution of the oxygen density is explained with reference to the following table.

TABLE

| Example No. | Reproducing Output [dB] | Noise [dB] |
| --- | --- | --- |
| (1) | 0 | 0 |
| (2) | −2 | +1 |
| (3) | −1 | +1 |
| (4) | −4 | +2 |

In the table, a magnetic recording film of example (1) has the following distribution of oxygen density: the first magnetic layer 2 has the high oxygen density area proximate the second magnetic layer 3, and the second magnetic layer 3 has the high oxygen density area proximate the first magnetic layer 2. That is the example (1) is the magnetic recording film in accordance with the present invention.

A magnetic recording film of example (2) has the following distribution of oxygen density: the first magnetic layer 2 has the high oxygen density area proximate the second magnetic layer 3, and the second magnetic layer 3 has the high oxygen density area proximate the surface of the magnetic recording film.

A magnetic recording film of example (3) has the following distribution of oxygen density: the first magnetic layer 2 has the high oxygen density area at a vicinity of the substrate 1, and the second magnetic layer 3 has the high oxygen density area at a vicinity of the first magnetic layer 2.

A magnetic recording film of example (4) has the following distribution of oxygen density: the first magnetic layer 2 has the high oxygen density area at a vicinity of the substrate 1, and the second magnetic layer 3 has the high oxygen density area proximate the surface of the magnetic recording film.

The table shows measured data with regard to the reproducing output and noise in the above-mentioned examples of the magnetic recording films. The magnetic recording films, which had been utilized in the above-mentioned measurements, had a thickness of 1400 Å [Angstrom] as a whole thickness, and had a thickness of 100 Å as a carbon protective layer 4 on a surface of each magnetic recording film. The values of the reproducing outputs in the table were measured by reproducing signals of wavelength 0.5 μm. The noise value in the table indicates values of noise outputs of a frequency corresponding to wavelength 0.6 μm when the signals of wavelength 0.5 μm were recorded and reproduced. The values of the reproducing output and the noise in the table are shown relative to a value of the example (1) as 0 dB.

As seen from the results in the table, the example (1) of the magnetic recording film in accordance with the present invention has much higher reproducing output and lower noise than examples (2), (3) or (4).

The reason the reproducing output of example (1) is higher than that of example (2) is because the oxygen density of the example (1) is lower than of the example (2) at a vicinity of the surface of the second magnetic layer 3. The reason the noise of example (1) is lower than that of example (2) is because the example (1) is weak in the ferromagnetic coupling between the first magnetic layer 2 and the second magnetic layer 3 in comparison with example (2). And further, the reasons the reproducing output of example (1) is higher than that of examples (3) and (4) and the noise of example (1) is lower than that of examples (3) and (4), are because the example (1) is weak in the ferromagnetic coupling between the first magnetic layer 2 and the second magnetic layer 3 in comparison with examples (3) and (4). Especially in the example (4), since the ferromagnetic coupling between the first magnetic layer 2 and second magnetic layer 3 is stronger than the others. The results are expressed in the table.

Therefore, the magnetic recording medium having two evaporated magnetic layers having cobalt-based alloy including oxygen in accordance with the present invention has a high S/N ratio in comparison with the other magnetic recording medium having a different distribution of the oxygen density.

In the above-mentioned magnetic recording medium, in order to provide the magnetic recording medium having a further improved reproducing output, the first magnetic layer 2 is preferably formed to have a higher coercive force in a longitudinal direction than a coercive force in a longitudinal direction of the second magnetic layer 3. The following means together make the first magnetic layer 2 and the second magnetic layer 3. An incident angle for producing the first magnetic layer 2 is set to be higher than an incident angle for the second magnetic layer 3. A substrate temperature for producing the first magnetic layer 2 is set to be higher than a substrate temperature for the second magnetic layer 3. In addition, the introduction of the amount of oxygen may be controlled.

With regard to the above-mentioned coercive force, concrete examples are as follows: A magnetic recording film of example (5) was produced to have a first magnetic layer 2 having coercive force of 1800 Oe [Oersted] in a longitudinal direction, and a second magnetic layer 3 having coercive force of 1600 Oe in a longitudinal direction. A magnetic recording film of example (6) was produced to have a first magnetic layer 2 and a second magnetic layer 3 which have coercive force of 1800 Oe, respectively. A magnetic recording film of example (7) was produced to have a first magnetic layer 2 and a second magnetic layer 3 which have coercive force of 1600 Oe, respectively. In the above-mentioned examples (5), (6) and (7), the example (5) has higher reproducing output 1–2 dB than the magnetic recording film of examples (6) and (7). The reason why such results are obtainable is because the recording demagnetization is affected by the coercive force. Improved recording demagnetization is obtainable by using a magnetic recording medium of which the coercive force in a longitudinal direction of the first magnetic layer 2 is higher than the coercive force in a longitudinal direction of the second magnetic layer 3. As a result, a strong recorded magnetization and high reproducing output is obtainable in the magnetic recording medium in accordance with the present invention.

In the above-mentioned two-layer structure, a high reproducing output is obtainable by such structure because a surface side magnetic layer is produced having lower coercive force than that of a substrate side magnetic layer. Such results are quite opposite to a conventional longitudinal magnetic recording medium. The above results are produced by that the magnetic recording medium in accordance with the present invention having magnetic layers in which the axis of easy magnetization slants from the normal of the plane of the magnetic recording medium.

Figure 4:
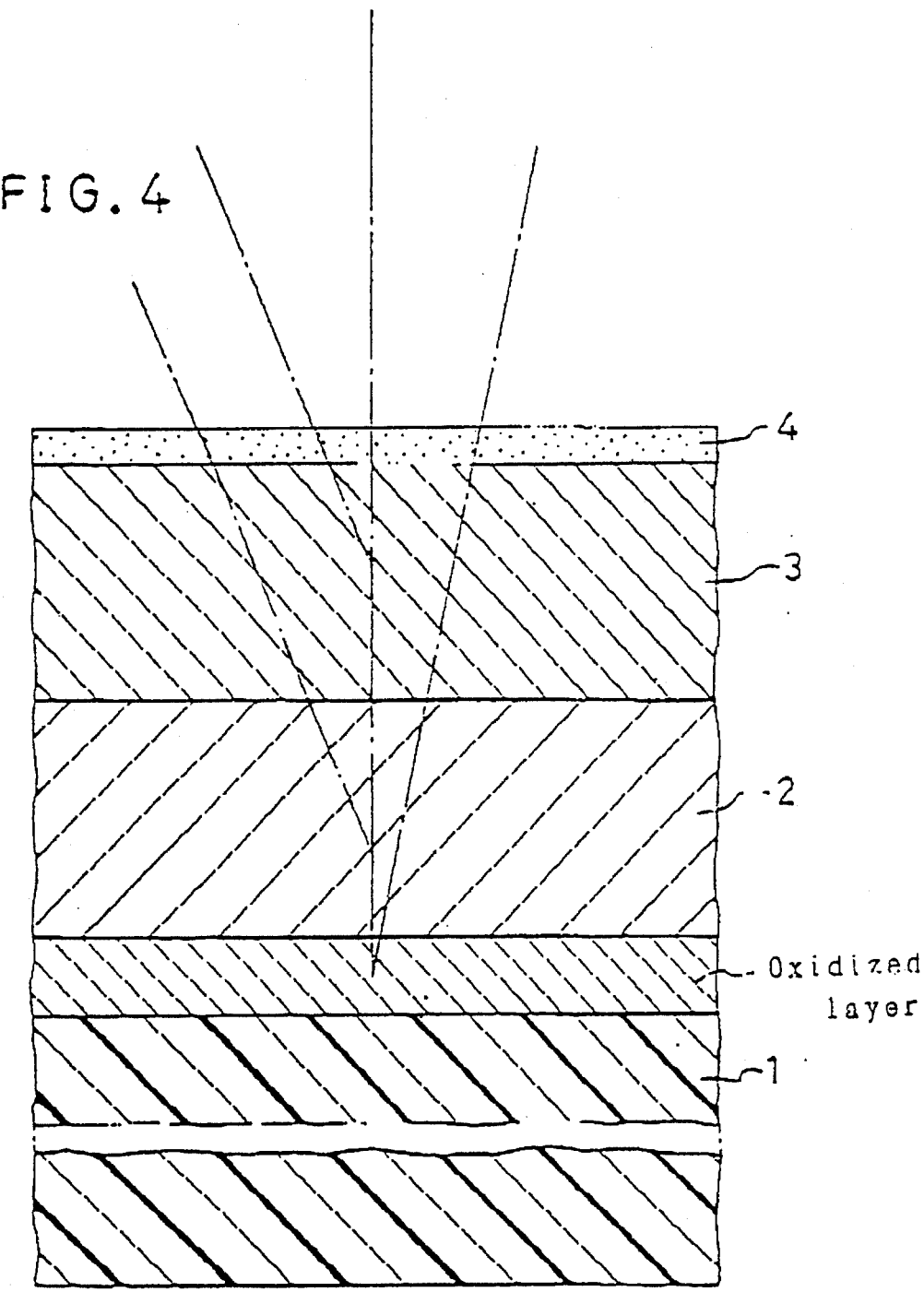
FIG. 4 is a cross-sectional view of a magnetic recording medium in accordance with an alternate embodiment of the present invention.

Though the above-mentioned magnetic recording medium has the first magnetic layer 2 and the second magnetic layer 3, a cobalt-based oxidized layer may be further formed on the substrate of high polymer, with the first magnetic layer 2 and the second magnetic layer 3 produced on the cobalt-based oxidized layer. The magnetic recording medium further having the oxidized layer has improved reproducing output, 1–2 dB, in comparison with the magnetic recording medium having only the first and second magnetic layers 2 and 3. Referring now to FIG. 4, cobalt-based oxidized layer is formed by substantially the same producing process as the first and second magnetic layers, provided that the necessary amount of the oxygen for changing all evaporated metal to the oxidized layer is introduced from the nozzle 10.

The oxidized layer deposited by the above-mentioned producing process has a columnar structure. In the columnar structure, an inclination direction of a columnar grain against a normal of a plane of the magnetic recording medium is arranged to be in the opposite direction to an inclination direction of a columnar grain of the first and second magnetic layers 2 and 3. As a result, improved magnetic characteristics and excellent recording and reproducing characteristics are obtainable by the magnetic recording medium in accordance with the present invention.

An example of a magnetic recording film is provided hereafter.

A CoO layer as a cobalt-based oxidized layer was deposited on a substrate 1 of high polymer using the vacuum evaporation apparatus shown in FIG. 2. Cobalt as the magnetic material 7 is melted in the melting pot, and serves as an evaporation source 8. The cylindrical can 20 which is disposed over the evaporation source 8, has a diameter of 1 m [Meter], and the surface of the cylindrical can 20 is kept at room temperature (about 20° C.). A polyethylene terephthalate film having a thickness of 7 μm was used as a substrate 1 of high polymer film.

Deposition of the oxidized layer was carried out under the following conditions: the initial incident angle θi was 35°, and the final incident angle θf was 20°. Oxygen was introduced at 3 liter/min. through the nozzle 10 into the vacuum chamber.

In the above-mentioned conditions, the substrate 1, which was 500 mm in width, was transferred on the circumference of the cylindrical can 20 which was rotating as shown by an arrow 6A of FIG. 2. The cylindrical can 20 was rotated at a peripheral velocity of 150 m/min. The oxidized layer having thickness of 0.02 μm was formed on the substrate 1 at an average deposition rate 0.5 μm/s. The deposited oxidized-layer had a columnar structure of which an angle of inclination of a columnar grain was about 20° from the normal of the plane of the layer.

After deposition of the oxidized layer on the substrate 1 was finished, a roll on which the substrate 1 coated with the oxidized layer had been wound was removed from the position of the take-up roll 12, and was located at the position of the supply roll 11 shown in FIG. 2.

In the next process, a first magnetic layer 2 was deposited on the oxidized layer on the substrate 1, which was transferred in a direction shown by an arrow 6A in FIG. 2. In the deposition for the first magnetic layer 2, cobalt was used as the magnetic material 7 which had been used in the deposition for CoO layer as the oxidized layer. The cylindrical can 20 was kept at room temperature (about 20° C.).

Deposition of the first magnetic layer 2 was carried out under the following conditions; the initial incident angle θi was 75°, and the final incident angle θf was 55°. Oxygen was introduced at 1.2 liter/min. through the nozzle 10 into the evaporated magnetic metal.

In the above-mentioned conditions, the substrate 1 was transferred on the circumference of the cylindrical can 20 which was rotating as shown by an arrow 6A. The cylindrical can 20 was rotated at a peripheral velocity of 80 m/min. The first magnetic layer 2 having a thickness of 0.06 μm was deposited on the oxidized layer at an average deposition rate 0.3 μm/s.

Next, the substrate 1 wound on the take-up roll 12 was rewound by the supply roll 11 in a direction shown by an arrow 6B of FIG. 2. In the rewinding operation, the electric power for the evaporation source 8 was turned off, and the window 13C was closed by a shutter (not shown in FIG. 2).

In the next process, a second magnetic layer 3 was deposited on the first magnetic layer 2 while the substrate 1 was transferred in a direction shown by an arrow 6A. Cobalt was used as the magnetic material 7 which was used in the deposition for the first magnetic layer 2. The cylindrical can 20 was kept at room temperature (about 20° C.). Deposition of the second magnetic layer 3 was carried out under the following conditions; the initial incident angle θi was 75°, and the final incident angle θf was 55°. Oxygen was introduced at 1.0 liter/min. from the nozzle 10.

In the above-mentioned conditions, the substrate 1 was transferred on the circumference of the cylindrical can 20 which was rotating as shown by an arrow 6A. The cylindrical can 20 was rotated at a peripheral velocity of 80 m/min. The second magnetic layer 3 having thickness of 0.06 μm was deposited on the first magnetic layer 2 at an average deposition rate of 0.3 μm/s.

The first magnetic layer 2 and the second magnetic layer 3 had the same angles of about 50° of inclination of a columnar grain from the normal of the plane of the magnetic recording film. Therefore, the inclinations of the columnar grains of the first magnetic layer 2 and the second magnetic layer 3 were in the same side with respect to a normal of a plane of the magnetic recording film as shown in FIG. 1. The directions of the inclinations in the first magnetic layer 2 and the second magnetic layer 3 were opposite to the CoO layer with respect to the normal of the plane of the magnetic recording film.

After finishing deposition of the second magnetic layer 3 of the magnetic recording film, the substrate 1 having the second magnetic layer 3 was taken out from the vacuum evaporation apparatus. The substrate 1 having the first magnetic layer 2 and the second magnetic layer 3 was located in a vacuum chamber for the plasma treatment and for the deposition of a protective layer. In the vacuum chamber, mixing gas $CH_4$ and Ar was turned into plasma state. The plasma treatment was carried out onto the surface of the second magnetic layer 3 by blowing the surface of the second magnetic layer 3 by the plasma. The surface of the second magnetic layer 3 was exposed for a predetermined time interval between 0.2–2.0s. The magnetic recording film was kept at room temperature (about 20° C.) in the plasma treatment. As a result, the oxygen density of the surface of the second magnetic layer 3 was decreased, and the high oxygen density area in the second magnetic layer 3 was arranged proximate the first magnetic layer 2. The first magnetic layer 2 and the second magnetic layer 3 formed by the above-mentioned process had a distribution of the oxygen density like that shown in FIG. 3.

The magnetic recording film having the first magnetic layer 2 and the second magnetic layer 3 was cut in plural tapes to produce thin film magnetic recording tapes. The characteristics of recording and reproducing were evaluated with a ring type magnetic head made of Sendust having a gap length of 0.17 μm. For comparison, the same test as above was repeated with a conventional metal evaporated tape for "H 8" VCR (Video Cassette Recorder). The results of the evaluation were as follows: Thin film magnetic recording tape in accordance with the present invention had reproducing output of 3 dB by utilizing recording signals of wavelength of 3.8 μm, or reproducing output 6 dB by recording signals 0.54 μm, or reproducing output 8 dB by recording signals 0.38 μm, in comparison with the conventional metal evaporated tape for "H 8" VCR. The above results means that the thin film magnetic recording tape in accordance with the present invention has much higher reproducing output than the conventional metal evaporated tape.

Further, the thin film magnetic recording tape in accordance with the present invention has lower noise about 1 dB in all bands than the conventional metal evaporated tape. Therefore, the thin film magnetic recording tape of the present invention has a high S/N ratio in comparison with the conventional metal evaporated tape.

The above-mentioned example has the high S/N ratio by utilizing the first and second magnetic layers of Co—O layer deposited by condition of the initial incident angle θi of 75°, and the final incident angle θf of 55°. A magnetic recording medium was formed by utilizing other producing conditions, methods and materials so that the first magnetic layer 2 has a high oxygen density area proximate the second magnetic layer 3 and the second magnetic layer 3 has a high oxygen density area proximate the first magnetic layer 2. As a result, the produced magnetic recording medium had a high reproducing output and a high S/N ratio.

Apart from the above-mentioned examples wherein the first and second magnetic layers are formed by Co—O, suitable materials to be used in the cobalt-based first and second magnetic layers can be chosen properly from the alloys: Co—O, Co—Ni—O, Co—Fe—O, Co—Ni—Fe—O.

Also apart from the above-mentioned examples wherein the substrate 1 is formed by a polyethylene terephthalate film, suitable materials for the substrate 1 used in the magnetic recording medium of the present invention can be chosen properly from high polymer films, such as polyethylene terephthalate film, polyethylene naphthalate film, polyimide film, polyamide film and polyetherimide film.

Apart from the above-mentioned embodiment wherein $CH_4$ was used as the gas for plasma treatment, a modified embodiment may be such that Hydrocarbon gas, such as $C_2H_6$, $C_4H_{10}$ or the like was used for plasma treatment.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A magnetic recording medium comprising:
   a substrate;
   a cobalt and oxygen containing first magnetic layer formed on said substrate, said first magnetic layer having a surface remote from said substrate, wherein the axis of easy magnetization slants from a normal line of the plane of said substrate and wherein the oxygen concentration within said first magnetic layer is at a maximum proximate the surface of said first magnetic layer remote from said substrate; and
   a cobalt and oxygen containing second magnetic layer formed on said first magnetic layer, wherein the axis of easy magnetization slants from a normal line of the plane of said substrate and wherein the oxygen concentration within said second magnetic layer is at a maximum proximate said first magnetic layer.

2. A magnetic recording medium in accordance with claim 1, wherein
   the coercive force in a longitudinal direction of said first magnetic layer is higher than the coercive force in a longitudinal direction of said second magnetic layer.

3. A magnetic recording medium in accordance with claim 1, further comprising
   a cobalt containing oxidized layer between said substrate and said first magnetic layer.

4. A magnetic recording medium in accordance with claim 2, further comprising
   a cobalt containing oxidized layer between said substrate and said first magnetic layer.

5. A magnetic recording medium in accordance with claim 3, wherein
   said first magnetic layer and said second magnetic layer each have a structure of columnar grains and inclinations of columns of columnar grains of said first magnetic layer and said second magnetic layer are in the same side with respect to a normal of a plane of said magnetic recording medium, and
   said cobalt containing oxidized layer has a structure of columnar grains and inclinations of a column of columnar grains of said first and second oxidized layer and said cobalt-based magnetic layers are in the opposite side with respect to a normal of a plane of said magnetic recording medium.

6. A magnetic recording medium in accordance with claim 4, wherein
   said first magnetic layer and said second magnetic layer each have a structure of columnar grains and inclinations of columns of columnar grains of said first magnetic layer and said second magnetic layer are in the same side with respect to a normal of a plane of said magnetic recording medium, and
   said oxidized layer has a structure of columnar grains and inclinations of a column of columnar grains of said first and second oxidized layer and said cobalt-based magnetic layers are in the opposite side with respect to a normal of a plane of said magnetic recording medium.

7. The magnetic recording medium of claim 1 further comprising a protective layer formed on the second magnetic layer.

8. The magnetic recording medium of claim 7 wherein the protective layer comprises carbon.

* * * * *